Figure 1:
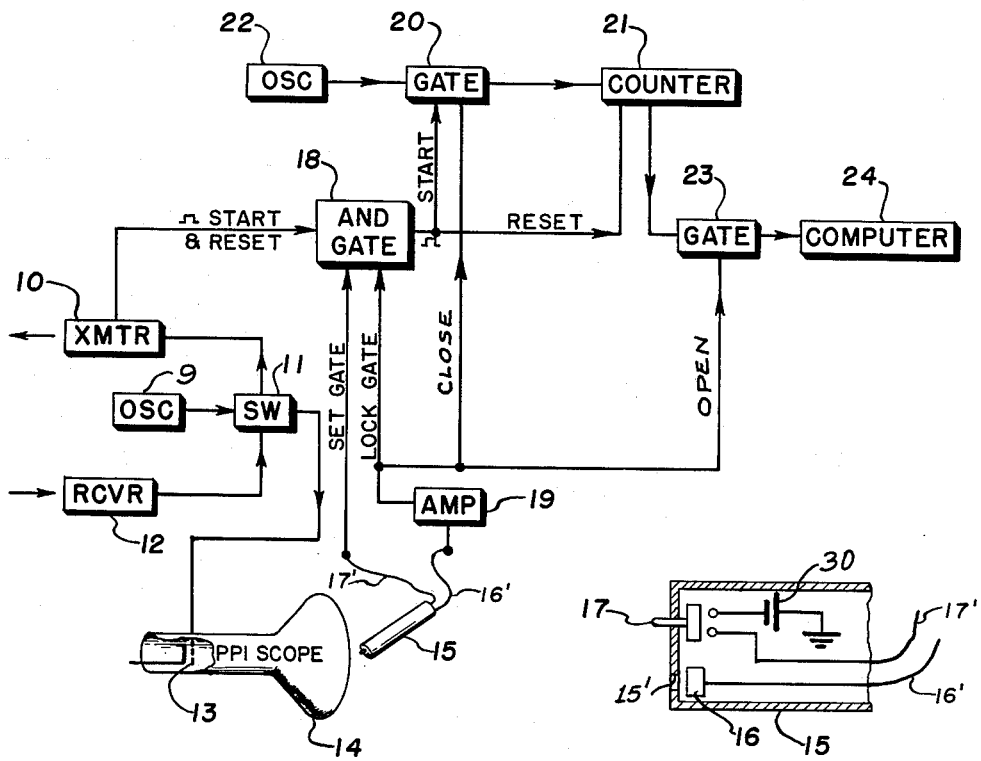

April 27, 1965  A. M. HENNE  3,181,154

DIGITAL RANGE READOUT FOR SONAR AND RADAR

Filed Aug. 7, 1962

*INVENTOR.*
*ALFRED M. HENNE*

BY

*ATTORNEYS*

United States Patent Office 3,181,154
Patented Apr. 27, 1965

3,181,154
DIGITAL RANGE READOUT FOR SONAR AND RADAR
Alfred M. Henne, P.O. Box 4325, Panama City, Fla.
Filed Aug. 7, 1962, Ser. No. 215,466
2 Claims. (Cl. 343—13)
(Granted under Title 35, U.S. Code (1952), sec. 266)

The invention described herein may be manufactured and used by or for the Government of the United States of America for governmental purposes without the payment of any royalties thereon or therefor.

This invention relates to radiated-signal reflector ranging systems and more particularly to such echo ranging systems in which the range readout is made from a display scope used in PPI presentation.

Present echo ranging equipment relies either directly or indirectly upon cathode ray tube deflection circuits to provide range information, which circuits are generally subject to drift, are not necessarily linear, and in any event are very difficult to calibrate. When as is usual a cursor is used it is very time consuming to make readings successively on several targets.

It is an object of the present invention to increase the accuracy of range readout for echo ranging systems.

It is another object of the invention to provide an improved ranging system in which the range is determined independently of the deflection circuitry in the target locating display scope.

In accordance with a feature of the invention range readout inaccuracies due to operator carelessness are minimized by requiring only that the operator place a probe over the target spot on the display scope within a certain accuracy for it to be effective.

In accordance with another feature of the invention, the range is determined by measuring the actual transit time of a target echo by enabling during such transit time a counter connected to a fixed frequency oscillator. By selecting an oscillator frequency which is numerically equal to ½ the speed in yards per second of sound in water, the readout of the counter is direct and requires no interpretation. For radar application, the oscillator frequency could be made numerically equally to ¼ the speed of light in yards per second with the counter counting in increments of 2.

In accordance with the present invention a hand held probe, which is preferably a photo cell mounted in the end of a pen-like holder and provided with a push-button switch adapted to be closed by the operator or by contact when the holder is placed against the face of a scope over a target selected by the operator, is employed to select a target and generate a timing pulse. The closing of the push-button switch conditions a gate which can then be closed by a light generated pulse to preserve the counter reading for it to be noted by the operator and at the same time make it available to a computer either in binary or decimal form with the light generated pulse providing the transfer pulse.

Figure 2:
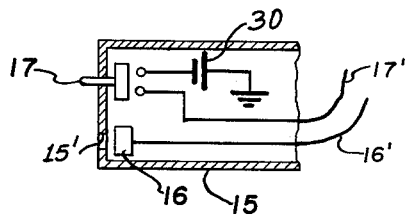

For a better understanding of the invention, together with further objects thereof, reference is had to the following description taken in connection with the accompanying drawing wherein:

FIG. 1 is a block diagram of an echo ranging system in accordance with the invention, and FIG. 2 is a fragmentary view in section of a portion of the hand held probe.

The echo ranging system shown in FIG. 1 was designed for under-water catacoustic systems, e.g., sonar, but it will be obvious to one skilled in the art that it is equally applicable to radar systems or to sound-in-air systems. As shown in FIG. 1, an oscillator 9 is adapted to periodically energize a transmitting transducer 10 as controlled by a TR switch 11. Reflected energy from a target is picked up by a receiver 12 and fed into the intensity control grid 13 of a suitable display tube 14 which ordinarily is equipped with deflection circuits (not shown) for providing a PPI type display. The transmitter 10 each time it is energized, delivers a start and reset pulse through a normally open latching relay such as the AND gate 18 to a gate 20 and a counter 21, respectively, to open the gate 20 (if it is closed) and to reset the counter 21. The gate 20 connects the counter 21 to a fixed frequency oscillator 22.

A hand manipulated light sensitive probe 15 is provided at one end with a relatively small aperture 15' behind which is mounted a light sensitive cell 16 adapted to be energized by a brightened spot, i.e., a target, on the face of the tube 14 when placed thereover by the operator. The probe 15 is also provided with a normally open switch member 17 which may be positioned to be actuated by the operator or, as illustrated, to be closable by pressure against the face of the tube 14 when a target is selected and the probe 15 is placed thereover. Closure of the switch 17 connects a battery 30 through a lead 17' to set or condition the gate 18 so that the gate 18 will be locked when a light generated pulse is applied thereto from the photocell 16 via a lead 16' and an amplifier 19. The AND gate 18 being effectively a latching relay remains closed as long as the switch 17 stays closed. The light generated pulse from the cell 16 after passing through the amplifier 19 is also applied as a closing pulse to the gate 20 and as an opening pulse to a gate 23 for connecting the counter 21 to a computer 24.

The gate 20 is preferably provided with a flip-flop type gating circuit so that it is stable in either open or closed condition, thus when the light generated pulse from the amplifier 19 closes the gate 20 the reading on the counter 21 is preserved for viewing as long as the operator maintains the switch 17 in closed position, i.e., the AND gate 18 remains closed thereby blocking any start pulse from the gate 20 and any reset pulse from the counter 21. In operating the system, the operator upon noting the appearance of a satisfactory target on the face of the display tube 14, places the probe 15 against the face of the tube 14 with the probe aperture 15' over the displayed target. This action closes the switch 17 to condition the AND gate 18 so that the next time the target area is illuminated the pulse generated by the cell 16 after passing through the amplifier 19 latches the AND gate 18 in closed position, closes the gate 20 to freeze the counter 21 at its then existing value and opens the gate 23 for transferring the information on the counter 21 to the computer 24. It is, of course, to be understood that the computer 24 is an optional part of the equipment and is not necessary for the enjoyment of the benefits of the invention. Also, it will be understood that the oscillator 22 can be made adjustable in frequency output to correspond to the speed of sound in the water in which the operation is taking place so as to maintain a direct reading of range on the counter 21. Inasmuch as it requires a finite, albeit small, time interval for the fluorescent screen on the display tube 14 to brighten in response to a received signal on its intensity grid 13, when this small time interval is substantial relative to a measuring cycle of the system, as would be the case in radar, the start and reset pulse from the transmitter 10 should be delayed by an equal time interval so as to compensate for the brightening time of display on the tube 14.

It will be evident from the above that the present system has the advantage of greater accuracy in target selection since if the small aperture 15' in the front of the cell 16 is not placed substantially over a target no range is read out. This system also has the advantage of requiring less operator training or concentration since the use of the probe 15 is primarily a pointing action which most people naturally can do with the required accuracy. Another advantage is that the readout is legible to the operator and others as desired without the need for interpretation as well as being directly available, i.e., numerically correct, for computer input, this latter being relatively unimportant since the computer 24 can readily handle information which would be illegible to the operator. Finally, the accuracy provided by the present system depends only on the accuracy of the constant frequency oscillator 22 and its relationship to the speed of the radiated-reflected energy in the ambient medium.

While for the purpose of disclosing the invention a specific embodiment thereof has been described, it will be evident to those skilled in the art that many modifications may be made in the system without departing from the invention the scope of which is pointed out in the appended claims.

What is claimed is:

1. In a pulse echo ranging system in which echoes of transmitted pulses returned by a distant target are utilized to brighten a spot on the viewing screen of a cathode ray tube,
    means for transmitting periodically pulses toward a distant target,
        a fixed frequency oscillator having an output,
        a counter,
    means for resetting the counter and for connecting the counter to the output of said oscillator at the time a pulse is transmitted,
    means including a hand manipulated light sensitive probe operative when placed over a brightened spot on said screen for disconnecting the counter from the output of said oscillator at the time a returned echo pulse brightens said spot and
    means under the control of an operator for disabling said counter resetting and connecting means for any desired interval of time.

2. In a pulse echo ranging system in which the returned echo of a transmitted pulse is utilized to brighten a spot on the face of a cathode ray tube
    a fixed frequency oscillator,
    a counter,
    means for simultaneously transmitting a pulse toward a target, resetting the counter and connecting the counter to said oscillator, and
    a light sensitive proble operative when positioned over a brightened spot on the face of said tube to disconnect the counted from said oscillator.

References Cited by the Examiner
UNITED STATES PATENTS

| | | | |
|---|---|---|---|
| 2,855,589 | 10/58 | Baker et al. | 343—7 |
| 2,903,690 | 9/59 | Slack | 343—5 |
| 3,102,926 | 9/63 | Fluhr et al. | 343—7 |
| 3,108,269 | 10/63 | Collis | 343—6 |

FOREIGN PATENTS 764,478   12/56   Great Britain.

CHESTER L. JUSTUS, *Primary Examiner.*

KATHLEEN H. CLAFFY, *Examiner.*